United States Patent
Bletsky et al.

(10) Patent No.: US 12,369,581 B2
(45) Date of Patent: Jul. 29, 2025

(54) METHODS FOR WEED GROWTH CONTROL

(71) Applicant: MustGrow Biologics Corp., Saskatoon (CA)

(72) Inventors: Colin Bletsky, Saskatoon (CA); Todd Lahti, Saskatoon (CA); Corey Giasson, Corman Park (CA); David Maenz, Saskatoon (CA)

(73) Assignee: MustGrow Biologics Corp., Saskatoon (CA)

( * ) Notice: Subject to any disclaimer, the term of this patent is extended or adjusted under 35 U.S.C. 154(b) by 554 days.

(21) Appl. No.: 17/770,574

(22) PCT Filed: Oct. 21, 2020

(86) PCT No.: PCT/CA2020/051408
§ 371 (c)(1),
(2) Date: Apr. 20, 2022

(87) PCT Pub. No.: WO2021/077214
PCT Pub. Date: Apr. 29, 2021

(65) Prior Publication Data
US 2022/0400673 A1 Dec. 22, 2022

Related U.S. Application Data

(60) Provisional application No. 62/941,930, filed on Nov. 29, 2019, provisional application No. 62/923,674, filed on Oct. 21, 2019.

(51) Int. Cl.
*A01N 43/16* (2006.01)
*A01N 25/02* (2006.01)
*A01P 13/00* (2006.01)

(52) U.S. Cl.
CPC .............. *A01N 43/16* (2013.01); *A01N 25/02* (2013.01); *A01P 13/00* (2021.08)

(58) Field of Classification Search
CPC .. A01P 13/00; A01P 13/02; A01P 3/00; A01P 5/00; A01P 7/04; A01P 1/00; A01P 7/00; A01P 9/00; A01P 7/02; A01N 25/02; A01N 25/04; A01N 25/30; A01N 43/16; A01N 47/46; A01N 57/20; A01N 65/08
See application file for complete search history.

(56) References Cited

U.S. PATENT DOCUMENTS

| | | | |
|---|---|---|---|
| 2010/0317518 A1 | 12/2010 | Stevens et al. | |
| 2018/0125077 A1 | 5/2018 | Morra et al. | |
| 2018/0255772 A1* | 9/2018 | Flemmens | ................ A01P 7/00 |

FOREIGN PATENT DOCUMENTS

| | | | | |
|---|---|---|---|---|
| CN | 1205835 A | | 1/1999 | |
| CN | 102334499 A | * | 2/2012 | ............. A01N 47/46 |
| JP | S51142535 A | | 12/1976 | |
| JP | S59 144707 A | | 8/1984 | |
| WO | WO2009/012485 A1 | * | 1/2009 | ............... A23K 3/00 |
| WO | 2017007950 A1 | | 1/2017 | |

OTHER PUBLICATIONS

CN102334499A translation (Year: 2012).*
Matteo R et al., "Effectiveness of defatted seed meals from Brassicaceae with or without crude glycerin against black grass (*Alopecurus myosuroides* Huds.)". Industrial Crops and Products, 2018, vol. 111, pp. 506-512, ISSN 0926-6690.
Vaughn SF et al., "Herbicidal activity of glucosinolate-containing seedmeals". Weed Science, 2006, vol. 54, pp. 743-748.
Hara M et al: "Exogenously applied isothiocyanates enhance glutathione S-transferase expression in *Arabidopsis* but act as herbicides at higher concentrations", Journal of Plant Physiology, Elsevier, Amsterdam, NL, vol. 167, No. 8, May 15, 2010 (May 15, 2010), pp. 643-649, XP026988775, ISSN: 0176-1617 [retrieved on Apr. 1, 2010].
Morra Matthew J. et al: "Bioherbicidal activity of Sinapis alba seed meal extracts", Industrial Crops and Products, vol. 115, May 1, 2018 (May 1, 2018), pp. 174-181, XP093031595, NL ISSN: 0926-6690, DOI: 10.1016/j.indcrop.2018.02.027.
Extended European Search Report for application No. 20879742.3 dated May 10, 2023.
Office action for Chinese application No. 202080090007.0 dated May 31, 2023.
Exogenously applied isothiocyanates enhance glutathione S-transferase expression in *Arabidopsis* but act as herbicides at higher concentrations. Journal of Plant Physiology (2010).
Pesticide vol. 45, No. 7 Dec. 31, 2006 Cao Aocheng et al. "A Potential Bromomethane Soil Disinfection Alternative—Allyl isothiocyanate".

* cited by examiner

*Primary Examiner* — Audrea B Coniglio
(74) *Attorney, Agent, or Firm* — SMART & BIGGAR LP; Micheline Gravelle

(57) ABSTRACT

Provided are methods to control growth of weed plants. The methods involve the application of a liquid formulation comprising a herbicidally effective amount of a thiocyanate preparation or isothiocyanate preparation to the foliage of weed plants. The thiocyanate preparation or isothiocyanate preparation can be provided in the form of a glucosinolate hydrolysate.

16 Claims, 1 Drawing Sheet

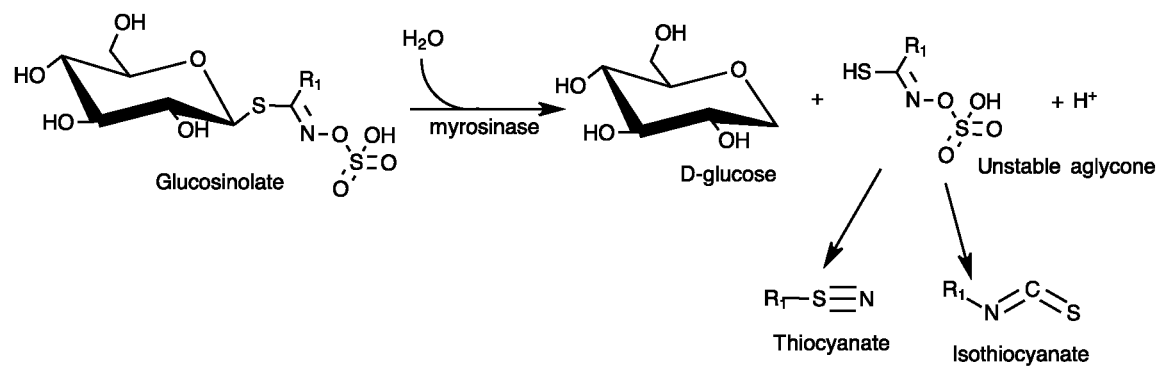

METHODS FOR WEED GROWTH CONTROL

CROSS-REFERENCE TO RELATED APPLICATIONS

This application is a national phase entry of PCT/CA2020/051408 filed Oct. 21, 2020, which claims the benefit of U.S. Provisional Patent Application No. 62/923,674 filed Oct. 21, 2019, and U.S. Provisional Patent Application No. 62/941,930 filed Nov. 29, 2019; the entire contents of Patent Applications 62/923,674 and 62/941,930 are hereby incorporated by reference.

FIELD OF THE DISCLOSURE

The present disclosure relates to methods for controlling weed growth. In particular, the present disclosure relates to methods and compositions for foliar application to control weed growth in the proximity of cultivated plants.

BACKGROUND OF THE DISCLOSURE

The following paragraphs are not an admission that anything discussed in them is prior art or part of the knowledge of persons skilled in the art.

The growth of undesirable plants, such as weeds, can reduce the amount of resources available to cultivated plants and can thus have a negative effect on the cultivated plants' quality or yield. A wide variety of chemical herbicides and herbicidal application techniques and equipment have evolved to control the growth of weeds in commercial agriculture, as well as in horticulture, where weeds are often deemed to be unsightly. However, the large scale use of chemical herbicides has resulted in significant concerns regarding the environmental impact and toxicity of herbicide use on non-target species, including humans. Thus, for example, several countries have recently taken steps to restrict or ban the use of the herbicide glyphosate over human health concerns. In this respect, biological herbicides can offer a more desirable alternative to control weed growth. However, relatively few effective biological herbicidal agents are commercially available to consumers or farmers. In particular, there are very few biological herbicides available that may be applied to weed foliage post-emergence. Post-emergence herbicides are desirable in that they are only used and applied after it has been determined that weeds will have a negative effect on the growth of cultivated plants. There remains therefore a need in the art for biological herbicides, and in particular, there remains a need in the art for methods and compositions that permit post-emergence foliar application.

SUMMARY OF THE DISCLOSURE

The following paragraphs are intended to introduce the reader to the more detailed description that follows and not to define or limit the claimed subject matter.

The present disclosure relates to methods for weed growth control. Accordingly, the present disclosure provides, in at least one aspect, in at least one embodiment, a method for controlling growth of a weed plant, the method comprising applying a liquid formulation comprising a herbicidally effective amount of a thiocyanate or isothiocyanate preparation to foliage of a weed plant to thereby control growth of the weed plant.

In at least one embodiment, the thiocyanate or isothiocyanate preparation can be a hydrolyzed glucosinolate preparation.

In at least one embodiment, the hydrolyzed glucosinolate preparation can be a plant seed extract.

In at least one embodiment, the hydrolyzed glucosinolate preparation can be a plant seed meal extract.

In at least one embodiment, the hydrolyzed glucosinolate preparation can be a substantially pure preparation.

In at least one embodiment, the hydrolyzed glucosinolate preparation can be obtained from a mustard plant.

In at least one embodiment, the hydrolyzed glucosinolate preparation can comprise allyl thiocyanate (ATC).

In at least one embodiment, the hydrolyzed glucosinolate preparation can comprise allyl isothiocyanate (AITC).

In at least one embodiment, the liquid formulation can additionally comprise a diluent, an excipient, or a carrier.

In at least one embodiment, the liquid formulation can comprise from about 0.4 mg/ml to about 50 mg/ml of the thiocyanate or isothiocyanate preparation.

In at least one embodiment, the liquid formulation can be applied to the foliage of the weed plant pre-emergence of a cultivated plant.

In at least one embodiment, the liquid formulation can be applied to the foliage of the weed plant post-emergence of a cultivated plant.

In at least one embodiment, the liquid formulation can be applied post-emergence of a cultivated plant, by selective application to the foliage of one or more weed plants located in the proximity of one or more cultivated plants.

In at least one embodiment, the cultivated plant can be an agricultural plant or a horticultural plant.

In at least one embodiment, the agricultural plant can be wheat (*Triticum aestivum*), corn (*Zea mays*), rice (*Oryza sativa*), soybean (*Glycine max*), oilseed rape (*Brassica napus*), sunflower (*Helianthus annuus*), cotton (*Gossypium hirsutum*), peanut (*Arachis hypogaea*), tomato (*Solanum lycopersicum*), or *Cannabis* (*Cannabis sativa*).

In at least one embodiment, the weed plant can be a dicotelydenous weed plant or monocotelydenous weed plant.

In at least one embodiment, the weed plant can be a perennial weed plant.

In at least one embodiment, the liquid formulation can comprise from about 0.4 mg/ml to about 50 mg/ml of the thiocyanate or isothiocyanate preparation and can be applied at a rate of from about 10 gal/acre to about 20 gal/acre.

In at least one embodiment, the cultivated plant can be a horticultural plant and the liquid formulation can be applied using a handheld spray bottle containing the liquid formulation.

In at least one embodiment, the liquid formulation can be co-applied with another herbicidal formulation or with a pesticidal formulation.

In at least one embodiment, the pesticidal formulation can be an insecticide or a fungicide.

In another aspect, the present disclosure provides, in at least one embodiment, a kit or commercial package for controlling growth of a weed plant comprising:
  (a) a liquid formulation comprising a herbicidally effective amount of a thiocyanate or isothiocyanate preparation; and
  (b) instructions for the application to foliage of a weed plant to thereby control growth of the weed plant.

In at least one embodiment, the instructions comprise instructions to apply the liquid formulation following emergence of the weed plant and the appearance of at least one weed leaf.

In another aspect, the present disclosure provides a use of a thiocyanate or isothiocyanate preparation. Accordingly, in one aspect the present disclosure provides, in at least one embodiment, a use of a thiocyanate or isothiocyanate preparation to prepare a liquid formulation comprising a herbicidally effective amount of the thiocyanate or isothiocyanate preparation for application to foliage of a plant weed to thereby control growth of the weed plant.

In another aspect, the present disclosure provides a use of a liquid formulation comprising a thiocyanate or isothiocyanate preparation. Accordingly, in one aspect the present disclosure provides, in at least one embodiment, a use of a liquid formulation comprising a herbicidally effective amount of a thiocyanate or isothiocyanate composition to control growth of the weed plant by foliar application of the liquid formulation.

Other features and advantages of the present disclosure will become apparent from the following detailed description. It should be understood, however, that the detailed description, while indicating preferred embodiments of the disclosure, are given by way of illustration only, since various changes and modifications within the spirit and scope of the disclosure will become apparent to those of skill in the art from the detailed description.

BRIEF DESCRIPTION OF THE DRAWINGS

The disclosure is in the hereinafter provided paragraphs described, by way of example, in relation to the attached figures. The figures provided herein are provided for a better understanding of the example embodiments and to show more clearly how the various embodiments may be carried into effect. The figures are not intended to limit the present disclosure.

FIG. 1 is a schematic view of chemical reaction depicting the hydrolysis of glucosinolates yielding a glucosinolate hydrolysate.

DETAILED DESCRIPTION OF THE DISCLOSURE

Various methods, compositions or systems will be described below to provide an example of an embodiment of each claimed subject matter. No embodiment described below limits any claimed subject matter and any claimed subject matter may cover methods, compositions or systems that differ from those described below. The claimed subject matter is not limited to methods, compositions or systems having all of the features of any one method, composition or system described below, or to features common to multiple or all of the compositions, systems or processes described below. It is possible that a method, composition or system described below is not an embodiment of any claimed subject matter. Any subject matter disclosed in a method, composition or system described below that is not claimed in this document may be the subject matter of another protective instrument, for example, a continuing patent application, and the applicants, inventors or owners do not intend to abandon, disclaim or dedicate to the public any such subject matter by its disclosure in this document.

As used herein and in the claims, the singular forms, such as "a", "an" and "the" include the plural reference and vice versa unless the context clearly indicates otherwise.

Throughout this specification, unless otherwise indicated, "comprise," "comprises" and "comprising" are used inclusively rather than exclusively, so that a stated integer or group of integers may include one or more other non-stated integers or groups of integers.

The term "or" is inclusive unless modified, for example, by "either".

When ranges are used herein, such as for concentrations, for example, all combinations and sub-combinations of ranges and specific implementations therein are intended to be included. Other than in the operating examples, or where otherwise indicated, all numbers expressing quantities of ingredients or reaction conditions used herein should be understood as being modified in all instances by the term "about." The term "about" when referring to a number or a numerical range means that the number or numerical range being referred to is an approximation within experimental variability (or within statistical experimental error), and thus the number or numerical range may vary between 1% and 15% of the stated number or numerical range, as will be readily recognized by context. Furthermore, any range of values described herein is intended to specifically include the limiting values of the range, and any intermediate value or sub-range within the given range, and all such intermediate values and sub-ranges are individually and specifically disclosed (e.g. a range of 1 to 5 includes 1, 1.5, 2, 2.75, 3, 3.90, 4, and 5). Similarly, other terms of degree such as "substantially" and "approximately" as used herein to modify a term is understood to mean a reasonable amount of deviation of the modified term such that the end result is not significantly changed. These terms of degree should be construed as including a deviation of the modified term if this deviation would not negate the meaning of the term it modifies.

Unless otherwise defined, scientific and technical terms used in connection with the formulations described herein shall have the meanings that are commonly understood by those of ordinary skill in the art. The terminology used herein is for the purpose of describing particular implementations only, and is not intended to limit the scope of the present disclosure, which is defined solely by the claims.

All publications, patents and patent applications are herein incorporated by reference in their entirety to the same extent as if each individual publication, patent or patent application was specifically and individually indicated to be incorporated by reference in its entirety.

Definitions

The term "thiocyanate", as used herein, refers to a class of chemical compounds having the chemical structure:

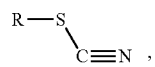

wherein —R is any side group —R$_1$ of a glucosinolate, or wherein —R is an electron pair.

The term "isothiocyanate", as used herein, refers to a class of chemical compounds having the chemical structure:

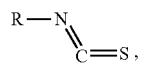

wherein —R is any side group —R$_1$ of a glucosinolate.

The term "glucosinolate" refers to a class of chemical compounds having the chemical structure:
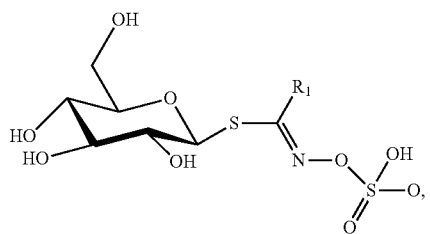
and includes any glucosinolate compound wherein can be selected from any one of:
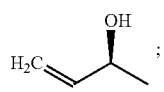 (I)
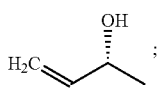 (II)
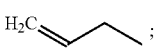 (III)
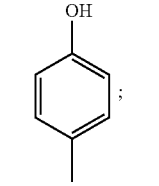 (IV)
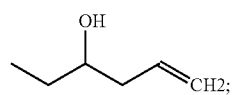 (V)
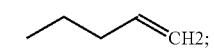 (VI)
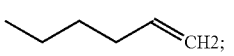 (VII)
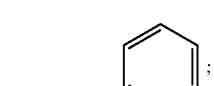 (VIII)
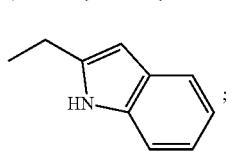 (IX)
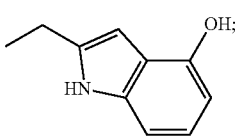 (X)
-continued
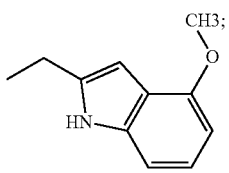 (XI)
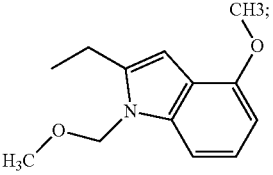 (XII)
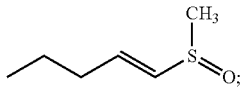 (XIII)
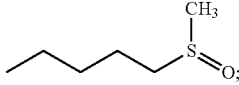 (XIV)
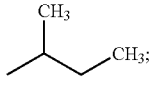 (XV)
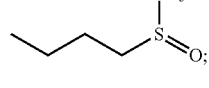 (XVI)
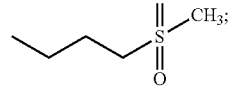 (XVII)
 (XVIII)
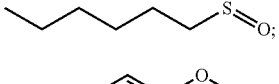 (XIX)
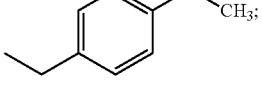 (XX)
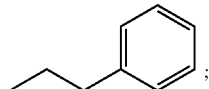 (XXI)
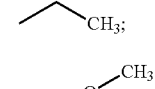 (XXII)
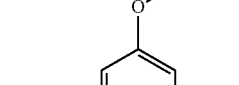 (XXIII)
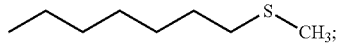 (XXIV)

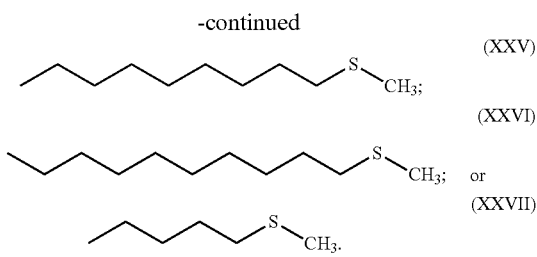

It is noted that the corresponding glucosinolates are also known as: progoitrin (I); epiprogoitrin (II); sinigrin (III); sinalbin (IV); gluconapoleiferin (V); gluconapin (VI); glucobrassicanapin (VII); gluconasturtiin (VIII); glucobrassicin (IX); 4-hydroxyglucobrassicin (X); 4-methoxy-glucobrassicin (XI); neoglucobrassicin (XII); glucoraphenin (XIII); glucoraphanin (XIV); glucochlearin (XV); glucoiberverin (XVI); glucocheirolin (XVII); glucoapparin (XVIII); glucoalyssin (XIX); glucoaubrietin (XX); glucobarbarin (XXI); glucolepidin (XXII); glucolimnantin (XXIII); glucolesquerlin (XXIV); glucojirsutin (XXV); glucoarabin (XXVI); and glucoerucin (XXVII), respectively.

The terms "allyl thiocyanate", or "ATC", as may be used interchangeably herein, refer to the chemical compound having the chemical structure:

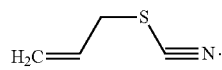

The term "allyl isothiocyanate" or "AITC", as may be used interchangeably herein, refer to the chemical compound having the chemical structure:

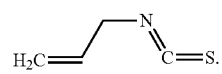

The expression "herbicidally effective amount", as used herein, refers to any amount that results in the retardation or stunting of growth of a weed plant for a limited or prolonged period of time, and further includes any amount that is lethal to the weed plant.

The phrase "controlling growth of a weed plant", as used herein, means that the growth of the weed plant is reduced, retarded or stunted compared to the growth in the absence of the liquid formulation comprising the herbicidally effective amount of a thiocyanate or isothiocyanate, and includes the killing of the weed plant.

The term "cultivated plant", as used herein, refers to a plant one chooses to grow for any agricultural or horticultural purposes.

The terms "weed" and "weed plant", as may be used interchangeably herein, refer to a plant whose growth is deemed undesirable, especially in the proximity of a cultivated plant.

The term "substantially pure", as used herein, in relation to a chemical substance refers to a preparation of such substance in which the substance has been separated from components that naturally accompany it. Typically, a chemical substance is substantially pure when at least 60%, more preferably, at least 75%, at least 80%, at least 90%, at least 95%, at least 96%, at least 97%, at least 98%, or at least 99% (by volume, by wet or dry weight, or by mole percent or fraction) in a sample is the compound of interest. Purity can be measured by any appropriate technique, e.g. gas chromatography (GC), or high performance liquid chromatography (HPLC).

General Implementation

As hereinbefore mentioned, the present disclosure relates to methods for controlling weed growth. The methods of the present disclosure permit the retardation of growth of weed plants, or can be lethal to weed plants. One attractive feature of the present disclosure is that the method involves the application of a herbicidal formulation post-emergence of weed plants, i.e. only when it is determined that weeds have a negative effect on cultivated plants. This in turn may limit the required quantities of herbicide to control weed growth. It is a further advantage of the methods of the present disclosure that the herbicidally active compounds can be obtained in the form of natural extracts.

In accordance herewith, in one aspect, the present disclosure provides, in at least one embodiment, a method for controlling growth of a weed plant, the method comprising applying a liquid formulation comprising a herbicidally effective amount of a thiocyanate or isothiocyanate preparation to foliage of a weed plant to thereby control growth of the weed plant.

The thiocyanate or isothiocyanate preparation can be prepared, for example, by obtaining a glucosinolate preparation and hydrolyzing the glucosinolate constituents therein to obtain a glucosinolate hydrolysate comprising thiocyanate compounds and/or isothiocyanate compounds. The pertinent glucosinolate hydrolysis reaction can be represented as shown in FIG. 1. It is noted that the hydrolysis reaction can be catalyzed by an enzyme known as myrosinase, as hereinafter further discussed.

A thiocyanate preparation, an isothiocyanate preparation, a glucosinolate preparation, or a glucosinolate hydrolysate can be obtained by isolation thereof from natural sources comprising glucosinolate compounds. Thus, plants comprising glucosinolates that may be used in accordance herewith. Such plants include plants belonging to the plant families of Brassicaceae (Cruciferae), Akianaceae, Bataceae, Bretschneideraceae, Capparaceae, Caricaceae, Drypetes (Euphorbiaceae), Gyrostemonaceae, Limnanthaceae, Moringaceae, Pentadiplantdraceae, Resedaceae, Salvadoraceae, Tovariaceae and Tropeaolaceae. The plants in accordance herewith may readily be obtained by growing or culturing such plants using conventional agricultural practices. In some embodiments, the glucosinolate preparation, glucosinolate preparation, thiocyanate preparation, or isothiocyanate preparation can be obtained from a mustard plant. The term "mustard" and "mustard family" as used herein denotes any plant belonging to the family of Brassicaceae, including any plant belonging to the genera *Brassica, Sinapis* and *Erysimum*. Mustard plants that may be used in accordance with the present disclosure include, but are not limited to, *Brassica napus* (rapeseed), *Brassica juncea* (Oriental, Indian or brown mustard), *Brassica carinata* (Abyssinian or Ethiopian mustard), *Brassica nigra* (black mustard), *Brassica rapa* (rapeseed), *Sinapis alba* (yellow or white mustard), *Sinapis arvensis* (wild mustard), *Erysimum corinthium* and any cultivars or variant of the foregoing, including the Canola cultivar of *Brassica napus*. In accordance herewith, mixtures of any of the hereinbefore mentioned plants or plant materials obtained from such plants may also be used.

A glucosinolate preparation, a glucosinolate hydrolysate, a thiocyanate preparation or a isothiocyanate preparation may be obtained by comminuting plants, plant parts, plant portions or plant material containing glucosinolates, or mixtures thereof, which may optionally be prepared or cleaned, for example, dried to remove moisture, or washed to remove extraneous materials, such as soil materials, or certain plant components, such as seed husks or hulls. Plant parts, plant portions and plant material that may be used as a source material include, but are not limited to, plant seeds, stems, roots or leaves obtainable from or obtained from plants of one of the hereinbefore mentioned plant species. Comminution of plant material may be achieved using comminution equipment, for example, a grinder, blender, or mill or another device capable of substantially fragmenting the plant material. Operating conditions are generally selected such that plant tissue is fragmented to a degree to which plant cell walls lose integrity and rupture.

In one embodiment, seed fractions, such as a seed meal, including a de-oiled seed meal, for example, can be used as the source material from which a glucosinolate preparation may be prepared. Such a de-oiled meal may be commercially purchased, or prepared by subjecting plant seeds to solvent extraction, hydraulic pressing, expeller pressing, cold pressing, or a combination thereof, or other oil removal techniques, which will be known to those of skill in the art, in order to obtain a de-oiled or defatted plant meal. The thus obtained seed fraction can then be used as a starting material to prepare a glucosinolate preparation.

Comminution of plant material is preferably performed in the presence of water or another aqueous extractant, including an aqueous buffer, or a lower alcohol, for example, a $C_1$-$C_4$ alcohol, or a lower ketone, for example a $C_3$-$C_4$ ketone, or mixtures thereof. Glucosinolates will readily dissolve in such aqueous extractants. The ratio of plant material to extractant can be selected to be less than about 1:100 (w/v), more preferably, less than or less than about 1:10 (w/v), and most preferably, less than or less than about 1:1 (w/v). Comminution can be performed at temperatures between 4° C. or about 4° C. and 50° C. or about 50° C., and preferably between 18° C. or about 18° C., and 25° C. or about 25° C. In other embodiments, comminution is performed in the absence of an extractant, and the extractant is mixed with the comminuted plant material. Subsequently, the solid comminuted plant material, including fibrous plant material non-soluble proteins and other non-soluble plant constituents, can be separated from the liquid fraction. Such separation may be achieved using separation equipment, including but not limited to decantation equipment, centrifugation equipment, or filtration equipment or other equipment suitable for the separation of the liquid fraction from the solid plant material. The thus obtained liquid fraction is a glucosinolate preparation that may be used in accordance herewith.

In some embodiments, upon having obtained the liquid fraction, the extraction/separation step may be repeated one or more times, in order to achieve further removal of further solid plant material. In addition, the solid plant material may be extracted two or more times, in order to improve the yield. Centrifugation may additionally be used to separate plant oils, in embodiments where the comminuted plant material comprises plant oils, such as plant seed oils, from the aqueous fraction.

In some embodiments, the glucosinolates present in the liquid fraction may be concentrated and separated from other plant constituents present in the liquid fraction, using, for example, evaporation of the extractant and filtration, through, for example, one or more ion-exchange filtration steps, or through nano-filtration, to obtain a more purified concentrate, for example, a substantially pure glucosinolate preparation, or, as hereinafter described, a substantially pure hydrolyzed glucosinolate preparation can be obtained.

Referring again to FIG. 1, the enzyme myrosinase can catalyze the conversion of glucosinolates to obtain a glucosinolate hydrolysate comprising glucose, unstable aglycone, and thiocyanate compounds and/or isothiocyanate compounds. In general, plants containing glucosinolates also contain myrosinase. However, glucosinolates are generally stable *in vivo* in plant cells, since myrosinase is stored in a different intracellular compartment, or in different plant cells. The hydrolysis reaction can be initiated during the comminution step when cell walls are broken and glucosinolates and myrosinase come into contact with one another. Thus, the thiocyanate compounds and/or isothiocyanate compounds can be formed during the comminution and extraction process.

It is noted that the degree to which the hydrolysis reaction proceeds can be controlled by controlling the temperature at which the comminution and extraction/separation steps are conducted. Thus, for example, by conducting these steps, at for example, about 4° C., the obtained glucosinolate preparation may contain predominantly intact glucosinolates. The thus obtained glucosinolate concentrate may be freeze-dried, or spray dried in order to obtain a substantially dry glucosinolate concentrate, or the preparation may be stored in liquid form at, for example, about 4° C. Concentrations of glucosinolate in the preparation may vary from about 5% to about 100%, preferably 5%-80%, and most preferably 5%-50%. At a later stage, the preparation may be obtained and the hydrolysis reaction may be conducted by ensuring sufficient quantities of water or an aqueous buffer are present and the temperature of the preparation is brought up to, for example, from about 18° C. to about 40° C.

In other embodiments, the plant material prior to or during comminution may be heated to temperatures in excess of about 60° C., about 70° C., or about 80° C. At these temperatures, the myrosinase activity is substantially irreversibly lost. Thus a glucosinolate preparation substantially free of hydrolysis products may be obtained. In such embodiment it will be necessary to subsequently exogenously add myrosinase to obtain a hydrolyzed glucosinolate preparation. Myrosinase preparations may be obtained as described, for example, by Wade et al., 2015, Phytochem Anal. 26(1):47-53, or Bellostas et al., 2008, J. Biochem. Biophys Methods 70(6):918-925, or commercially purchased from e.g. Sigma Aldrich, and used to contact with a glucosinolate preparation to thereby hydrolyze the glucosinolate constituents in the preparation.

In embodiments hereof in which the plant material is comminuted, extracted, separated, and, optionally, further extracted, at temperatures from about 18° C. to about 40° C., and preferably from about 18° C. to about 25° C., and the plant material is not exposed to temperatures above about 40° C., the glucosinolate constituents in the glucosinolate preparation will undergo hydrolysis during these steps, and a glucosinolate hydrolysate comprising thiocyanate compounds and/or isothiocyanate compounds is obtained.

In the obtained glucosinolate hydrolysate, at least about 50%, about 60%, about 70%, about 80%, about 90%, about 95%, or about 99% of the glucosinolate constituents is hydrolyzed. The obtained glucosinolate hydrolysate can comprise from about 1 mg/ml to about 50 mg/ml thiocyanate or isothiocyanate, for example, about 5 mg/ml, about 10 mg/ml, about 20 mg/ml, about 25 mg/ml, about 30 mg/ml or about 40 mg/ml. The thiocyanate compounds that may be present in a glucosinolate hydrolysate in accordance with the present disclosure include allyl isothiocyanate (AITC) and allyl thiocyanate (ATC). It is noted, that the glucosinolate hydrolysate, in addition to one or more isothiocyanate and/or thiocyanate compounds, may contain other constituents, including additional hydrolysis products, such as glucose, aglycones, and breakdown products of aglycones, such as nitriles, oxazolidine-2-thiones, and epithionitriles, for example. Thus, in some embodiments, the isothiocyanate preparation or the thiocyanate preparation of the present disclosure can be a mixture comprising two or more isothiocyanate compounds, or two or more thiocyanate compounds, respectively, or the isothiocyanate preparation or the thiocyanate preparation of the present disclosure can be a mixture comprising two or more compounds selected from the following: a thiocyanate compound; an isothiocyanate compound; glucose; aglycone; and an aglycone breakdown product other than an isothiocyanate or a thiocyanate.

In some embodiments, the glucosinolate hydrolysate may be used to extract isothiocyanate or thiocyanate compounds to obtain a more or less pure isothiocyanate or thiocyanate preparation from which myrosinase, non-isothiocyanate or thiocyanate hydrolysis products, such as glucose, and aglycone products have been removed to obtain a substantially pure isothiocyanate or thiocyanate preparation. Such more or less pure preparations may be obtained using, for example, chromatographic techniques.

Analytical techniques to quantify glucosinolates, glucosinolate hydrolysis, and glucosinolate hydrolysis products are known to the art and include, for example, enzymatic assays in which a glucosinolate preparation is subjected to hydrolysis using commercially obtained myrosinase. The formed glucose can in turn be converted by hexokinase and glucose-6-phosphate dehydrogenase, which results in the production on nicotine adenine dinucleotide phosphate (NADPH), which be detected spectrophotometrically at 340 nm or 520 nm. Furthermore, gas-chromatography techniques and high performance liquid chromatography techniques may also be used to quantify glucosinolates, glucosinolate hydrolysis and glucosinolate hydrolysis products, as further described, for example, in the European Food Safety Authority Journal, 2008, 590:1-76.

As hereinbefore noted, in one embodiment, the glucosinolate preparation, the glucosinolate hydrolysate preparation, the isothiocyanate preparation, or thiocyanate preparation may be obtained from a seed meal. In one example embodiment, the seed meal is a mustard seed meal. In accordance with this embodiment, any process yielding a mustard seed meal comprising glucosinolates may be used. Mustard seed can be purchased commercially or may readily obtained through conventional agricultural production of mustard plants. The mustard seed is preferably cleaned, in order to remove non-mustard plant material, and dried prior to further processing. In order to clean the mustard seed, the seed may be subjected to an elementary separation procedure, for example, by contacting the mustard seed with a separation means such as vibrating screen or a grain cleaning machine, for example, but not limited to, a grain cleaning machine such as manufactured by Damas A/S (Denmark). Through such operation the mustard seed may be separated from non-mustard seed material, such as rocks, sticks, dirt, leaves, weed seeds, loose hulls etc. Mustard seed may optionally be dried, using for example, equipment used for grain drying, such as a grain dryer, for example a grain dryer as manufactured by Vertec Industries Limited (Canada). The grain drying equipment may be operated so that the moisture content of the seed is reduced to, for example, between 5% or about 5% and 7% or about 7%. Dried mustard seed may be stored or mixed with other mustard seed. In order to prepare mustard seed meal, the outer seed coating, also known as the seed husk or bran, is optionally removed from the seed by milling or cracking the seed or using another suitable abrasive process to obtain the seed kernel. The oil or fat content in the seed meal that is prepared may vary. Full fat meals and defatted meals may both be used in accordance with the present disclosure. If a full fat meal is desired then the mustard seed, or optionally the seed kernels, are subjected to a process that does not result in oil extraction. If a defatted meal is desired then the seed, or optionally the seed kernels, are subjected to a process resulting in oil removal. In preferred embodiments of the present disclosure, a defatted meal is prepared. Accordingly, the mustard seed or seed kernels can be ground using grinding equipment, for example, a hammer mill, to obtain mustard flour. The seed oil may be removed from the flour, for example, by organic solvent extraction, using for example, hexane, or by mechanical separation from the non-oil components of the seed. Mechanical separation may be achieved using, for example, an oil expeller or press, such as an oil press such as a Täby Press manufactured by Skeppsta Maskin AB (Sweden) or a Komet oil expeller manufactured by Monforts Oekotec GmbH (Germany). A combination of mechanical oil removal followed by organic solvent extraction can also be used to achieve further removal of oil from the mustard seed. Preferably, the mustard seed meal used in accordance with the present disclosure comprises between at least 2% or about 2% and no more than 50% or about 50% of the total seed oil content, and more preferably approximately between 10% or about 10%, and 15% or about 15%, and most preferably 15% or about 15% of the total seed oil content. The seed meal obtained comprises active myrosinase complex in a concentration sufficient to release an effective amount of glucosinolate breakdown products upon the addition of water. The amount of water present in the final myrosinase preparation may vary from 1-99%, e.g. between 60-90%, 70-90% or 80-90%. In preferred embodiments of the present disclosure, the mustard seed meal comprising active myrosinase complex has a moisture content of less than 12% or about 12%. Spray dried preparations may also be obtained and comprise from about 0.5% to 5%, or from about 1% to about 3% water. Many processes for processing raw mustard seed into oil and meal known to the art. Further processes that may be used are the processes disclosed in Morra, M. J, 2000-2002, Subcontract Report National Renewable Energy Laboratory NREL/SR-510-3628, which is incorporated herein in its entirety by reference.

Thus, to briefly recap, a more or less pure glucosinolate preparation, glucosinolate hydrolysate, thiocyanate preparation, or isothiocyanate preparation may be prepared from natural source materials, notably plant materials naturally containing glucosinolate compounds. A glucosinolate preparation may be obtained and subjected to conditions permitting hydrolysis of the glucosinolate constituents of the preparation to thereby obtain a glucosinolate hydrolysate. The glucosinolate hydrolysate may be used as an isothiocyanate and/or thiocyanate preparation, or it may be used to extract isothiocyanate and/or thiocyanate.

Turning now to the preparation of a liquid formulation comprising thiocyanate or isothiocyanate, the thiocyanate or isothiocyanate preparation, prepared as described above, can be contacted with other ingredients in a suitable mixing vessel with agitation, such as a mechanical blender or mixer, or other suitable device producing sufficient circulation or agitation to thoroughly mix the ingredients. Mixing conditions, such as time and temperature, can be adjusted, but are generally selected to dissolve or suspend the thiocyanate or isothiocyanate preparation and obtain a homogenous liquid formulation. In general mixing can be performed at ambient conditions.

Other ingredients that may be included in the liquid formulation include at least one of a diluent, carrier or excipient. Suitable diluents include water, a buffer, an alcohol, water soluble polyols (e.g. glycol, glycerine, glycerol, diglycerin, triglycerin, polyglycerin), or a vegetable oil. Suitable excipients that may be included in the liquid formulation include surface active agents, pH-modifying agents (acids, bases, buffers), salts, anti-foaming agents, humidifying agents, penetrating agents, adherence agents, wetting agents, odorants, viscosity modifiers, co-herbicides (including, without limitation, any of the herbicides set forth in the present disclosure), pesticides (including, for example, insecticides or fungicides, and further including, without limitation, any of the pesticides set forth in this disclosure), pigments, anti-freeze agents, preservatives, and process aids. Suitable carriers that may be included in the liquid formulation include solid carriers such as, silicas, diatomaceous earth, chalk or clay. The order of addition of the ingredients to the thiocyanate or isothiocyanate preparation may be varied and is generally is not critical, however, it may be beneficial to initially mix the thiocyanate or isothiocyanate preparation with a diluent, and thereafter add the other ingredients.

It is noted that in embodiments hereof where a less pure glucosinolate preparation is used the non-glucosinolate constituents in the preparation may impart some of the properties of the above noted ingredients. Thus, for example, certain endogenous sugars may be retained in a glucosinolate preparation, and may facilitate adherence of the formulation to the plant foliar tissue.

In accordance herewith, the liquid formulation contains a herbicidally effective amount of a thiocyanate or isocyanate preparation. Such a liquid formulation can be prepared by including therein an amount of the thiocyanate or isocyanate preparation so that the final concentration of thiocyanate or isothiocyanate in the liquid formulation is at least about 0.4 mg/ml thiocyanate or isothiocyanate, and furthermore concentrations may range for example from about 1 mg/ml thiocyanate or isothiocyanate to about 50 mg/ml thiocyanate or isothiocyanate, for example, about 5 mg/ml, about 10 mg/ml, about 15 mg/ml, about 20 mg/ml, about 25 mg/ml, about 30 mg/ml, about 35 mg/ml, about 40 mg/ml, or about 45 mg/ml; or from about 0.4 mg/ml to about 50 mg/ml, from about 1 mg/ml to about 45 mg/ml, from about 5 mg/ml to about 40 mg/ml, from about 10 mg/ml to about 30 mg/ml, or from about 15 mg/ml to about 25 mg/ml.

In accordance herewith, the liquid formulation can be used to apply the liquid formulation to foliage of a weed plant to thereby control growth of the weed plant.

In general, in accordance herewith the liquid formulation can be used when one or more plants are cultivated, and it is deemed undesirable that weed plants grow in the proximity of the cultivated plants. In this respect, proximity includes at a distance of about 100 m or less, about 50 m or less, about 25 m or less about 10 m or less, about 5 m or less, or about 1 m or less. The cultivated plants may be any cultivated plants, including any agricultural or crop plants, or any horticultural plants during any stage of development. Agricultural crops include, without limitation, wheat (*Triticum aestivum*), corn (*Zea mays*), rice (*Oryza sativa*), soybean (*Glycine max*), oilseed rape (*Brassica napus*), sunflower (*Helianthus annuus*), cotton (*Gossypium hirsutum*), peanut (*Arachis hypogaea*), tomato (*Solanum lycopersicum*), and *Cannabis* (*Cannabis sativa*). Furthermore, the cultivated plants may be grown indoor, for example, in greenhouses, or outdoor, and at any scale, including for commercial agricultural or horticultural purposes, or for home and garden use.

The target weed plant may vary depending on, for example, the geographical location and environmental factors prevalent at the growth site of the cultivated plant, as will be readily appreciate by those of skill in the art. The methods of the present disclosure can be used to control growth of a wide variety of weed plants. Example weed plants include, without limitation, the following dicotelydenous plants: velvet leaf (*Abutilon theophrasti*), pigweed (*Amaranthus* spp.), buttonweed (*Borreria* spp.), oilseed rape, Canola, indian mustard, etc. (*Brassica* spp.), commelina (*Commelina* spp.), filaree (*Erodium* spp.), sunflower (*Helianthus* spp.), morningglory (*Ipomoea* spp.), kochia (*Kochia scoparia*), mallow (*Malva* spp.), wild buckwheat, smartweed, etc. (*Polygonum* spp.), purslane (*Portulaca* spp.), Russian thistle (*Salsola* spp.), sida (*Sida* spp.), wild mustard (*Sinapis arvensis*), and cocklebur (*Xanthium* spp.).

Further example weed plants include, without limitation, the following monocotelydenous plants: wild oat (*Avena-fatua*), carpetgrass (*Axonopus* spp.), downy brome (*Bromus tectorum*), crabgrass (*Digitaria* spp.), barnyard grass (*Echinochloa crusgalli*), goosegrass (*Eleusine indica*), annual ryegrass (*Lolium multiflorum*), rice (*Oryza sativa*), ottochloa (*Ottochloa nodosa*), bahiagrass (*Paspalum notatum*), canarygrass (*Phalaris* spp.), foxtail (*Setaria* spp.), wheat (*Triticum aestivum*) and corn (*Zea mays*).

Further example weed plants include, without limitation, the following perennial dicotyledonous plants: mugwort (*Artemisia* spp.), milkweed (*Asclepias* spp.), Canada thistle (*Cirsium arvense*), field bindweed (*Convolvulus arvensis*) and kudzu (*Pueraria* spp.).

Further example weed plants include, without limitation, the following perennial monocotelydenous plants: brachiaria (*Brachiaria* spp.), bermudagrass (*Cynodon dactylon*), quackgrass (*Elymus repens*), lalang (*Imperata cylindrica*), perennial ryegrass (*Lolium perenne*), guineagrass (*Panicum maximum*), dallisgrass (*Paspalum dilatatum*), reed (*Phragmites* spp.), johnsongrass (*Sorghum halepense*) and cattail (*Typha* spp.).

Yet, other perennial weed plant species include, without limitation, horsetail (*Equisetum* spp.), bracken (*Pteridium aquilinum*), blackberry (*Rubus* spp.), dandelion (*Taraxacum officinale*), and gorse (*Ulex europaeus*).

The liquid formulation may be applied at any stage of development of the foliage of the weed plant, including at a stage shortly following emergence of weed foliage, for example, within two or three days of the first visibly observable weed plant foliage, or at a stage when weed plants exhibit more mature weed plant foliage, for example, when weed plants exhibit at least 1 week, at least 2 weeks, at least 3, weeks, or at least 4 weeks old weed foliage, or when weed plants are at least at a one 1 leaf or 2 leaf growth stage of development. The application concentrations and frequency may be varied and may depend on for example, the desired degree of growth control, the age and species of weed plant one desires to control, weather and other conditions prevalent at the site of application. In general, application concentrations can range between about 10 gal/acre and 20 about gal/acre, for example, about 12.5 gal/acre, about 15 gal/acre or about 17.5 gal/acre, and the application frequency may vary from a single application to a daily, weekly or monthly application.

In some embodiments, the liquid formulation can be applied to the foliage of weed plants pre-emergence of the cultivated plant.

In some embodiments, the liquid formulation can be applied to the foliage of the weed plant, post emergence of the cultivated plant.

The degree of control may be varied as desired. Thus, for example, growth of the weed plant upon application of the liquid formulation, may be controlled so that weed plant growth is retarded or stunted, or so that the weed plant is killed.

In order to apply the liquid formulation, the liquid formulation may be sprayed, including by targeted spraying or broadcast spraying of the weed plant, or by wiping the foliage of the weed plant. Thus, the liquid formulation is preferably placed in a device that contains the liquid formulation and permits application of the liquid formulation to the foliage of weed plants, including any conventional dispensing or spraying device for herbicidal treatment, including any spray tank. In one example embodiment, the spraying device can be a hand-held spray bottle for household use from which the liquid formulation can be dispensed, thus permitting home and garden use of the liquid formulation.

It is noted in some embodiments, the liquid formulation may be specifically targeted to weed plants, while limiting contact of the liquid formulation with cultivated plants, including the foliage of cultivated plants, growing in the proximity of the weed plants. Such targeted application may be achieved using, for example, a spray tank or spray bottle. Thus, for example, berm weeds around an agricultural field may be sprayed in this manner, or, similarly, individual weed plants or patches containing weed plants in home gardens may be sprayed. Thus, the liquid formulation can be said to be useful for the selective application to the foliage of weed plants located in the proximity of cultivated plants.

It is further noted that, in some embodiments, the liquid formulation may be co-applied with at least one other herbicidal formulation or pesticidal formulation. In this respect, the term "co-applied" is intended to mean the simultaneous or sequential application of the liquid formulation of the present disclosure and the at least one other herbicidal or pesticidal formulation, notably, in such a manner that the cultivated plant benefits in a fashion superior to the additive effectiveness of the application of each of the individual formulations. Co-application can be achieved by pre-mixing, or tank-mixing each of the individual formulations, and subsequently applying the pre-mixed formulations, or by applying the first formulation (i.e. either the liquid formulation of the present disclosure, or the at least one other herbicidal or pesticidal formulation) and subsequently applying the second formulation. Generally, the second formulation can be applied less than 10 days following the application of the first formulation, for example less than 5 days, within 1 to 2 days, for example.

Thus, in some embodiments, the formulation of the present disclosure may be co-applied with another herbicidal formulation, or, for example, with another insecticidal or a fungicidal formulation. These formulations contain active compounds, i.e. herbicides, insecticides and fungicides, respectively.

Example herbicides that may be co-applied with the liquid formulations of the present disclosure include lipid synthesis inhibitors, for example, acetyl CoA carboxylase (ACCase) inhibitors, such as aryloxyphenoxypropionates (FOPs) (e.g. clodinafop-propargyl, cyhalofop-buytyl, cyclofop-methyl, fenoxaprop-P-ethyl, fluazifop-P-butyl, haloxyfop-R-methyl, propaquizafop, or quizalofop-P-ethyl), cyclohexadiones (DIMs) (e.g. alloxydim, butroxydim, clethodim, cycloxydim, profoxydim, sethoxydim, tepraloxydim, or tralkoxydim), or phenylpyrazolins (DENs) (e.g. pinoxaden).

Further example herbicides that may be co-applied with the liquid formulations of the present disclosure include amino acid synthesis inhibitors, for example, acetolacate (ALS) inhibitors, such as an imidazolinones (e.g. imazapic, imazamethabenz-methyl, imazamox, imazampyr, imazaquin, imazethapyr) pyrimidinyl(thio)benzoates (e.g. bispyribac-Na, pyribenzoxim, pyriftalid, pyrithiobac-Na, or pyriminobac-methyl), sulfonylaminocarbonyltriazolinones (e.g. flucarbazone-Na or propoxycarbazone-Na), sulfonylureas (e.g. amidosulfuron, azimsulfuron, bensulfuron-methyl, chlorimuron-ethyl, chlorsulfuron, cinosulfuron, cyclosulfamuron, ethametsulfuron-methyl, ethoxysulfuron, flazasulfuron, flupyrsulfuron-methyl-Na, foramsulfuron, halosulfuron-methyl, imazosulfuron, iodosulfuron, mesosulfuron, metsulfuron-methyl, nicosulfuron, oxasulfuron, primisulfuron-methyl, prosulfuron, pyrazosulfuron-ethyl, rimsulfuron, sulfometuron-methyl, sulfosulfuron, thislfuron-methyl, triasulfuron, tribenuron-methyl, trifloxysulfuron, triflusulfuron-methyl, or tritosulfuron), or triazolopyrimidines (e.g. cloransulam-methyl, diclosulam, florasulam, flumetsulam, metosulam, or penosulam); or other amino acid synthesis inhibitors, for example, EPSP synthase inhibitors, such as a glycine (e.g. glyphosate or sulfosate).

Further example herbicides that may be co-applied with the liquid formulations of the present disclosure include root growth inhibitors, for example microtubule inhibitors, such as benzamides (e.g. isoxaben), benzoic acids (e.g. chorthal-dimethyl (DCPA)), dinitroanilines (e.g. benefin (benfluralin), butralin, dinitramine, ethalfluralin, oryzalin, pendmethalin, or trifluralin) phosphoramidates (e.g. amiprophos-methyl or butamiphos), or pyridines (e.g. dithiopyr or thiazopyr).

Further example herbicides that may be co-applied with the liquid formulations of the present disclosure include plant growth inhibitors, such as benzoic acids (e.g. chorthal-dimethyl (DCPA)), phenoxycarboxylic acids (e.g. clomeprop, 2,4-D, 2,4-DB, dichlorprop (2,4-DP), 2-methyl-4-chlorophenoxyacetic acid (MCPA), 4-(chloro-2-methylphenoxy)butanoic acid (MCPB), or mecoprop (MCPP, CMPP), pyridine carboxylic acid (e.g. clopyralid, fluroxypyr, picloram, or triclopyr), or quinoline carboxylic acids (quinclorac or quinmerac).

Further example herbicides that may be co-applied with the liquid formulations of the present disclosure include photosynthesis inhibitors, such as triazines (e.g. ametrine, atrazine, cyanazine, desmetryne, dimethametryne, prometon, prometryne, propazine, simazine, simatryne, terbumeton, terbuthylazine, terbutryne trietazine), triazinones (e.g. hexazinone, metamitron, or metribuzin), phenylcarbamates (e.g. desmedipham or phenmedipham), pyridazinones (e.g. pyrazon (chloridazon)), uracils (e.g. bromacil, lenacil, or terbacil), nitriles (e.g. bromofenoxim, bromoxynil, or ioxynil), benzothadiazinones (e.g. bentazon), phenylpyridazines (e.g. pyridate or pyridafol), ureas (e.g. chlorobromuron, chlorotoluron, chloroxuron, dimefuron, diuron, ethidimuron, fenuron, fluometron, isoproturon, isouron, linuron, methabenzthiazuron, metobromuron, metoxuron, monolinuron, neburon, siduron, or tebuthioron), or amides (e.g. propanil or pentanochlor).

Further example herbicides that may be co-applied with the liquid formulations of the present disclosure include nitrogen metabolism inhibitors, for example, glutamine synthesis inhibitors, such as phosphinic acids (e.g. glufosinate ammonium or bialaphos (bilanaphos)).

Further example herbicides that may be co-applied with the liquid formulations of the present disclosure include pigment synthesis inhibitors, for example, 4-hydroxyphenylpyruvate dioxygenase (HPPD) inhibitors, such as amides, anilidex, furanones, phenoxybutan-amides, pyrazoles (e.g. pyrasulfotole, benzofenap, pyrazolynate, or pyrazoxyfen) pyrazolones (e.g. topramezone) pyridazinones (e.g. norflurazon), pyridines, triketones (e.g. mesotrione, bicyclopyrone, or tembotrione) or isoxazoles (e.g. isoxaflutole or isoxachlortole); or diterpene synthesis inhibitors, such as isoxalidinones (e.g. clomazone).

Further example herbicides that may be co-applied with the liquid formulations of the present disclosure include cell membrane disruptors, for example, protoporphyrinogen oxidase (PPO) inhibitors, such as diphenylethers (e.g. acifluorfen-Na, bifenox, chlomomethoxyfen, fluoroglycofen-ethyl, fomesafen, halosafen, lactfen, or oxyfluorfen), aryl triazolinones (e.g. carfentrazone-ethyl), N-phenylphtalamides (e.g. cinidon-ethyl, flumioxazin, or flumiclorac-pentyl), oxadiazoles (e.g. oxadiazon or oxadiargyl), oxazolidinediones (e.g. pentoxazone), phenylpyrazoles (e.g. fluazolate or pyraflufen-ethyl), pyrimidindiones (e.g. benzfendizone or butafencil), or thiadiazoles (e.g. fluthiacet-methyl or thidiazimin); and other membrane disruptors, including, for example, dinitrophenols (e.g. 4,6 dinitro-o-cresol (DNOC), dinoseb, or dinoterb); and further including (photosystem I) PSI inhibitors, including bipyridilium (e.g. diquat or paraquat).

Further example herbicides that may be co-applied with the liquid formulations of the present disclosure include shoot growth inhibitors, for example, very long chain fatty acid (VLCFA) inhibitors, such as chloroacetamides (e.g. acetochlor, alachlor, or butachlor), acetamides (e.g. diphenamid, napropamide, or naproanilide), oxyacetamides, or tetrazolinones (e.g. azafenidin, cafentrazone-ethyl, or sulfentrazone).

Yet further example herbicides that may be co-applied with the liquid formulations of the present disclosure include unclassified herbicides including disodium methyl arsonate (DMSA), fosamine, monosodium methane arsonate (MSMA), indaziflam, cinmethylin, methiozolin, acrolein, ammonium sulfate (AMS), benazolin, benoxacor, cacodylic acid, cloquintocet-mexyl, copper chelate, copper sulfate, cyprosulfamide, dicchlormid, dietholate, dimethipin, enothall, fenchlorazole-ethyl, fenchlorim, fluxofenim, maleic hydrazide, mefenpyr-diethyl, mefluidide, metaborate, oxaziclomefone, or sodium chlorate.

Turning now to insecticides that may be co-applied with the liquid formulations of the present disclosure, examples of insecticides that may be co-applied include inorganic insecticidal compounds, for example, arsenic compounds (e.g. lead arsenite, arsenic trioxide, or copper acetoarsenate (Paris green); or fluoride compounds (e.g. sodium fluoride or sodium fluoroaluminate (cryolite)).

Further examples of insecticides that may be co-applied with the liquid formulations of the present disclosure include soaps and oils, for example, water emulsions of petroleum distillates, or insecticidal soaps derived from animal or vegetable oils.

Further examples of insecticides that may be co-applied with the liquid formulations of the present disclosure include botanical extracts.

Further examples of insecticides that may be co-applied with the liquid formulations of the present disclosure include pyrethrum, which can be used together with a synergistic compound such as piperonyl butoxide.

Further examples of insecticides that may be co-applied with the liquid formulations of the present disclosure include organochlorines, also known as chlorinated hydrocarbons, for example, dichlorodiphenyltrichloroethane (DDT) and related compounds (e.g. methoxychlor and kelthane), lindane, toxaphene, or cyclodienes (e.g. aldrin, dieldrin, endrin, chordane, heptachlor, or endusulfan).

Further examples of insecticides that may be co-applied with the liquid formulations of the present disclosure include nerve poisonous insecticides, such as organophosphates, including, for example general purpose organophosphate insecticides such as malathion, parathion, diazinon, chlorpyrofos, azinphosmethyl, acephate, phorate or phosmet; fumigant organophosphate insecticides, such as 2,2-dichlorovinyl dimethyl phosphate (dichlorvos, DDVP); or systemic organophosphate insecticides, such as dimethoate, disulfoton, dimeton, or ronnel).

Further examples of insecticides that may be co-applied with the liquid formulations of the present disclosure include carbamates, such as carbaryl (sevin), carbofuran, propoxur, methomyl, bendiocarb, formetanate, oxamyl, or aldicarb, for example.

Further examples of insecticides that may be co-applied with the liquid formulations of the present disclosure include synthetic pyrethroids such as resmethrin, permethrin, or fenvalerate, for example.

Further examples of insecticides that may be co-applied with the liquid formulations of the present disclosure include foramidines, such as chlordimeform or amitraz, for example.

Further examples of insecticides that may be co-applied with the liquid formulations of the present disclosure include organosulfurs and organtins, such as aramite, tetradifon, cyhexatin, or hexakis, for example.

Further examples of insecticides that may be co-applied with the liquid formulations of the present disclosure include avermectins, such as avermectin, abamectin, or ivermectin, for example.

Further examples of insecticides that may be co-applied with the liquid formulations of the present disclosure include neonicotinoids, such as imidacloprid, for example.

Turning now to fungicides that may be co-applied with the liquid formulations of the present disclosure, examples of fungicides that may be co-applied include mitosis interrupting compounds, such as methyl benzimidazole carbamates, for example, benzimidazoles or thiophanates (e.g. thiophanate-methyl).

Further examples of fungicides that may be co-applied with the liquid formulations of the present disclosure include nicotinamide adenine dinucleotide (NADH) signaling interrupting compounds, such as dicarboximides, iprodione, for example.

Further examples of fungicides that may be co-applied with the liquid formulations of the present disclosure include sterol biosynthesis inhibitors, such as demethylation inhibitors, for example, difenoconazole, fenarimol, fenbuconazole, metconazole, myclobutanil, propiconazole, tebuconazole, or triflumizole.

Further examples of fungicides that may be co-applied with the liquid formulations of the present disclosure include RNA polymerase inhibitors, such as phenyl amides, for example, mefenoxam.

Further examples of fungicides that may be co-applied with the liquid formulations of the present disclosure include succinate dehydrogenase inhibitors such as carboxamides, for example, boscalid.

Further examples of fungicides that may be co-applied with the liquid formulations of the present disclosure include methionine biosynthesis inhibitors, such as, anilino pyrimidines, for example, cyprodinil.

Further examples of fungicides that may be co-applied with the liquid formulations of the present disclosure include respiration inhibitors, such as quinone outside inhibitors, for example, azoxystrobin, kresoxim-methyl, pyraclostrobin, or trifloxystrobin.

Further examples of fungicides that may be co-applied with the liquid formulations of the present disclosure include signal transduction interfering compounds, such as azanaphtanlenes, for example quinolines (e.g. quinoxyfen).

Further examples of fungicides that may be co-applied with the formulations of the present disclosure include protein synthesis inhibitors, such as a glucopyranosyl antibiotic, for example, streptomycin; or a tetracycline antibiotic, for example, oxytetracycline.

Further examples of fungicides that may be co-applied with the liquid formulations of the present disclosure include phosphonates, such as salts of phosphorous acid, or aluminum tris.

Further examples of fungicides that may be co-applied with the liquid formulations of the present disclosure include multi-site contact activity compounds such as inorganic compounds, for example copper hydroxide, fixed copper, or sulfur; dithiocarbamates and related compounds, for example thiram or ziram; phthalimides, for example, captan; chloronitriles (phthalonitriles), for example chlorothalonil; or guanidines, for example, dodine.

Yet further examples of fungicides that may be co-applied with the liquid formulations of the present disclosure include azadirachtin, bifenazate, or dicofol.

It will be understood that in accordance with the foregoing, the present disclosure further includes a use of a thiocyanate or isothiocyanate preparation to prepare a liquid formulation comprising a herbicidally effective amount of the thiocyanate or isothiocyanate preparation for application to foliage of a plant weed to thereby control growth of the weed plant.

In another aspect, the present disclosure provides a kit for controlling growth of a weed plant. Accordingly, the present disclosure provides, in another embodiment, a kit or commercial package for controlling growth of a weed plant, the kit or commercial package comprising:
 (a) a liquid formulation comprising a herbicidally effective amount of a thiocyanate or isothiocyanate preparation; and
 (b) instructions for the application to foliage of a weed plant to thereby control growth of the weed plant.

In some embodiments, the instructions will specify that the liquid formulation is to be applied following emergence of the weed plant and visibility of weed leaf tissue, for example, when the weed plant is in a one leaf or two leaf stage of development.

It will further be understood that in accordance with the foregoing, the present disclosure further includes a use of a liquid formulation comprising a herbicidally effective amount of a thiocyanate or isothiocyanate composition to control growth of the weed plant by foliar application of the liquid formulation.

Thus it will now be clear that the methods of the present disclosure permit the control of growth of weed plants by applying a liquid formulation containing natural herbicidal compounds, notably thiocyanate and isothiocyanate compounds present in a glucosinolate hydrolysate to the foliage of weed plants. Hereinafter are provided examples of specific embodiments for performing the methods of the present disclosure. The examples are provided for illustrative purposes only, and are not intended to limit the scope of the present disclosure in any way.

EXAMPLES

Example 1—Preparing a Isothiocyanate and Thiocyanate Containing Glucosinolate Hydrolysate A glucosinolate hydrolysate was prepared as follows: *Brassica juncea* seed was heated to 80° C. to deactivate the myrosinase activity, and thereafter ground to expel the oil. Water was added to the ground seed at 10 parts water to 1 part plant material and the resulting slurry was agitated such that the sinigrin enters into solution in the slurry. The slurry was then processed by centrifugation using a decanter to generate a liquid phase enriched in glucosinolate and extracted solids. The glucosinolate concentration in the liquid phase was further increased by nanofiltration to separate glucosinolate from minerals and other lower molecular weight water-soluble components. The glucosinolate concentration in the extract was then further concentrated by removal of residual oil in the extract by separation on a disk-stacked centrifuge. The liquid phase was then evaporated to further concentrate. The final semi-purified glucosinolate concentrate was then dried using a spray dryer to a final concentration of >30% sinigrin within the glucosinolate concentrate.

Dry mustard meal containing myrosinase was prepared as follows: whole seed white mustard (*Sinapis alba*) was pre-dried to <6% residual moisture followed by expelling of the seed to remove the bulk of the oil. The final meal contained less than 15% residual oil. Temperatures during pre-drying and expelling of the seed were maintained below 70° C. to prevent denaturation and thus loss of myrosinase activity.

In order to prepare a glucosinolate hydrolysate dry mustard meal was mixed at room temperature with the *Brassica juncea* glucosinolate concentrate in quantities such that the preparation contained 0.96 myrosinase units per mg of sinigrin. The obtained glucosinolate hydrolysate may be used to prepare a liquid herbicidal preparation.

Example 2—Preparation of a Liquid Formulation for Application to Weed Foliage

A glucosinolate hydrolysate according to Example 1 can be prepared and the hydrolysate can be diluted with water (e.g. 1:10 w/w). The liquid formulation can subsequently be used for application to foliage of a weed plant. This may be achieved by thoroughly mixing a quantity of the liquid formulation in a water tank (e.g. 1:5-1:100 dilution) and spraying the diluted formulation at 10-20 gal/acre on a field post-emergence of weed plants.

Example 3—Application of a Glucosinolate Hydrolysate Formulation to Weed Foliage to Control the Growth of Weed Plants A glucosinolate hydrolysate was prepared essentially as described in Example 1 by mixing 0.005 liter of a *Brassica juncea* glucosinolate concentrate containing about 30% (w/w) sinigrin with 0.005 liter of a myrosinase containing *Sinapis alba* seed meal preparation. The glucosinolate hydrolysate contained about 1 myrosinase per milligram of sinigrin. The total volume (0.01 liter) of glucosinolate hydrolysate was then diluted with 9.4 liters of water for application to a 25 sq. ft. test plot (located in Saskatoon, Saskatchewan), where a variety of native monocotelydenous and dicotelydenous weed plant species were emerging, and present in a 1-2 leaf developmental stage. In particular, the glucosinolate hydrolysate was applied at a rate of 20 gal/acre (186.7 litre/hectare) by spraying the glucosinolate hydrolysate on to the foliar tissue of the weed plants in the test plot. An adjacent 25 sq. ft. control plot was not treated with the glucosinolate concentrate. Fourteen days following treatment of the foliar tissue with the glucosinolate hydrolysate, all of the monocotelydenous and dicotelydenous weed plants in the test plot treated with the glucosinolate hydrolysate had died. By contrast, the weed plant population in the adjacent control plot had matured and expanded.

Fourteen days following glucosinolate treatment, the control plot was treated with a commercial liquid RoundUp® (glyphosate) formulation by spraying the control plot with the formulation. Two to three day following RoundUp® treatment, the weed plant population in the control plot was substantially reduced, however, at fourteen days following the RoundUp® treatment, weed plants were observed to be re-emerging and reestablishing themselves in the control plot. By contrast, no weed plants were observed in the test plot treated with the glucosinolate hydrolysate 28 days earlier.

The invention claimed is:

1. A method for reducing, retarding, or stunting growth of a weed plant, the method comprising applying a liquid formulation to foliage of a weed plant to thereby reduce, retard, or stunt growth of the weed plant, the liquid formulation comprising a hydrolyzed glucosinolate preparation containing from 0.4 mg/ml to 50 mg/ml of thiocyanate, the hydrolyzed glucosinolate preparation obtained by enzymatic hydrolysis of a glucosinolate containing *Brassica juncea* plant extract, the enzymatic hydrolysis having been catalyzed by a *Sinapis alba* myrosinase enzyme, wherein the liquid formulation further optionally comprises a diluent, an excipient, or a carrier.

2. The method according to claim 1, wherein the *Brassica juncea* plant extract is a *Brassica juncea* plant seed extract.

3. The method according to claim 1, *Brasssica juncea* plant extract is a *Brasssica juncea* plant seed meal extract.

4. The method according to claim 1, wherein the hydrolyzed glucosinolate preparation is an at least 90% pure preparation.

5. The method according to claim 1, wherein the thiocyanate is allyl thiocyanate (ATC).

6. The method according to claim 1, wherein the liquid formulation is applied to the foliage of the weed plant pre-emergence of a cultivated plant.

7. The method according to claims 1, wherein the liquid formulation is applied to the foliage of the weed plant post-emergence of a cultivated plant, optionally wherein the liquid formulation is applied post-emergence of a cultivated plant, by selective application to the foliage of one or more weed plants located in the proximity of one or more cultivated plants.

8. The method according to claim 1, wherein the cultivated plant is an agricultural plant or a horticultural plant.

9. The method according to claim 8, wherein the agricultural plant is wheat (*Triticum aestivum*), corn (*Zea mays*), rice (*Oryza sativa*), soybean (*Glycine max*), oilseed rape (*Brassica napus*), sunflower (*Helianthus annuus*), cotton (*Gossypium hirsutum*), peanut (*Arachis hypogaea*), tomato (*Solanum lycopersicum*), or Cannabis (*Cannabis sativa*).

10. The method according to claim 1, wherein the weed plant is a dicotelydenous weed plant or monocotelydenous weed plant.

11. The method according to claim 1, wherein the weed plant is a perennial weed plant.

12. The method according to claim 1, wherein the liquid formulation is applied at a rate of from 10 gal/acre to 20 gal/acre.

13. The method according to claim 1, wherein the cultivated plant is a horticultural plant and the liquid formulation is applied using a handheld spray bottle containing the liquid formulation.

14. The method according to claim 1, wherein the liquid formulation is co-applied with another herbicidal formulation, or a pesticidal formulation.

15. The method according to claim 14, wherein the pesticidal formulation is an insecticide or a fungicide.

16. A kit or commercial package for reducing, retarding, or stunting growth of a weed plant, the kit or commercial package comprising:

(a) a liquid formulation comprising a hydrolyzed glucosinolate preparation containing from 0.4 mg/ml to 50 mg/ml of thiocyanate, the hydrolyzed glucosinolate preparation obtained by enzymatic hydrolysis of a glucosinolate containing *Brassica juncea* plant extract, the enzymatic hydrolysis having been catalyzed by a *Sinapis alba* myrosinase enzyme; and (b) instructions for the application to foliage of a weed plant to thereby reduce, retard, or stunt growth of the weed plant, optionally wherein the instructions comprise instructions to apply the liquid formulation following emergence of the weed plant and the appearance of at least one weed leaf.

* * * * *